United States Patent
Li et al.

(10) Patent No.: US 11,735,184 B2
(45) Date of Patent: Aug. 22, 2023

(54) TRANSLATION AND SPEECH RECOGNITION METHOD, APPARATUS, AND DEVICE

(71) Applicant: Alibaba Group Holding Limited, Grand Cayman (KY)

(72) Inventors: Chen Li, Hangzhou (CN); Zuyi Bao, Hangzhou (CN); Hengyou Liu, Hangzhou (CN); Guangwei Xu, Hangzhou (CN); Linlin Li, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 122 days.

(21) Appl. No.: 16/937,349

(22) Filed: Jul. 23, 2020

(65) Prior Publication Data

US 2021/0027784 A1 Jan. 28, 2021

(30) Foreign Application Priority Data

Jul. 24, 2019 (CN) .......................... 201910672486.6

(51) Int. Cl.
*G10L 15/26* (2006.01)
*G10L 15/183* (2013.01)

(52) U.S. Cl.
CPC ............ *G10L 15/26* (2013.01); *G10L 15/183* (2013.01)

(58) Field of Classification Search
CPC ... G10L 15/26; G10L 15/183; G10L 15/1815; G10L 15/005; G06F 40/42
See application file for complete search history.

(56) References Cited

U.S. PATENT DOCUMENTS

| 5,758,023 A | 5/1998 | Bordeaux |
| 6,912,499 B1 | 6/2005 | Sabourin et al. |
| 7,043,431 B2 | 5/2006 | Riis et al. |

(Continued)

FOREIGN PATENT DOCUMENTS

CN 108510976 A 9/2018

OTHER PUBLICATIONS

Prajit et al. "Unsupervised Pretraining for Sequence to Sequence Learning", Sep. 7-11, 2017, Proceedings of the 2017 Conference on Empirical Methods in Natural Language Processing, pp. 383-391 Copenhagen, Denmark. (Year: 2017).*

(Continued)

*Primary Examiner* — Michelle M Koeth
*Assistant Examiner* — Darioush Agahi
(74) *Attorney, Agent, or Firm* — Lee & Hayes, P.C.

(57) ABSTRACT

A speech recognition method including performing speech recognition on an inputted speech to obtain a first text, correcting the first text according to an obtained mapping relationship between words in different languages to obtain at least one second text, and in response to determining that the at least one second text corresponds to the same language, outputting the first text, or in response to determining that the at least one second text corresponds to different languages, determine an outputted text according to first probability values corresponding to each of the at least one second text. By combining the mapping relationships between words in different languages in correcting the initial ASR result, the present application ensures the accuracy of the final speech recognition result.

21 Claims, 11 Drawing Sheets

(56) References Cited

U.S. PATENT DOCUMENTS

| | | | |
|---|---|---|---|
| 7,689,404 B2 | 3/2010 | Khasin | |
| 8,065,144 B1 | 11/2011 | Gillick | |
| 8,301,445 B2 | 10/2012 | Gruhn et al. | |
| 8,498,857 B2 | 7/2013 | Kopparapu et al. | |
| 10,593,321 B2 | 3/2020 | Watanabe et al. | |
| 2005/0125218 A1* | 6/2005 | Rajput | G06F 40/279 704/8 |
| 2005/0197837 A1 | 9/2005 | Suontausta et al. | |
| 2006/0206331 A1 | 9/2006 | Hennecke et al. | |
| 2009/0281789 A1* | 11/2009 | Waibel | G06F 40/40 704/260 |
| 2010/0324894 A1* | 12/2010 | Potkonjak | G06F 40/58 704/E15.044 |
| 2015/0364129 A1* | 12/2015 | Gonzalez-Dominguez | G10L 15/005 704/251 |
| 2018/0137109 A1 | 5/2018 | Mangoubi et al. | |
| 2018/0165278 A1* | 6/2018 | He | G06N 3/02 |
| 2018/0336900 A1* | 11/2018 | Zou | G06F 40/42 |
| 2018/0358005 A1 | 12/2018 | Tomar et al. | |
| 2019/0378497 A1 | 12/2019 | Lichun et al. | |
| 2020/0081982 A1* | 3/2020 | Tu | G06F 40/126 |
| 2020/0098370 A1* | 3/2020 | Arar | G06F 40/263 |
| 2020/0126544 A1* | 4/2020 | Scaria | G10L 15/22 |
| 2021/0019373 A1* | 1/2021 | Freitag | G10L 13/00 |

OTHER PUBLICATIONS

The PCT Search Report and Written Opinion dated Oct. 13, 2020 for PCT Application No. PCT/US20/43322, 8 pages.
The International Preliminary Report on Patentability for PCT Application No. PCT/US20/43322, dated Feb. 3, 2022, 7 pages.

* cited by examiner

TRANSLATION AND SPEECH RECOGNITION METHOD, APPARATUS, AND DEVICE

CROSS REFERENCE TO RELATED APPLICATIONS

This application claims priority to Chinese Patent Application No. 201910672486.6, filed on 24 Jul. 2019 and entitled "TRANSLATION AND SPEECH RECOGNITION METHOD, APPARATUS, AND DEVICE," which is incorporated herein by reference in its entirety.

TECHNICAL FIELD

The present disclosure relates to the field of Internet technologies, and, more particularly, to translation and speech recognition methods, apparatuses, and devices.

BACKGROUND

With the continuous development of artificial intelligence technology, using speech for human-machine interaction is quite common. In order for machines to understand a user's speech, it is necessary to first perform automatic speech recognition (ASR) on the user's speech to convert the speech into text. Natural language understanding is then performed on the converted text to obtain the user's intent, which is used to provide a feedback response to the user.

Existing speech recognition technology is often developed for monolingual speech recognition. The so-called monolingual speech refers to a speech that is made only in a certain language. However, in daily conversation, people are accustomed to including words of a second language when expressing thoughts in a first language. For example, "Wo Xiang Mai USB Shu Ju Xian" is a mix of Chinese and English (which means "I want to buy a USB cable" in English), "iPhone Shou Ji Zen Me Yang" is a mix of Chinese and English (which means "How about iPhone mobile phones" in English, "CPU Li Yong Lv Zen Me Suan" is a mix of Chinese and English (which means "How to calculate CPU utilization" in English). All of Chinese examples include English words such as USB, iPhone, CPU. Therefore, how to perform accurate speech recognition on a multilingual speech is a challenge that needs to be addressed urgently.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Example embodiments of the present disclosure provide translation and speech recognition methods, apparatuses, and devices, which accurately perform speech recognition on speech containing a plurality of languages.

An example embodiment of the present disclosure provides a speech recognition method comprising:
    performing speech recognition on an inputted speech to obtain a first text;
    correcting the first text according to an obtained mapping relationship between words in different languages to obtain at least one second text; and
    outputting the first text in response to determining that the at least one second text corresponds to a same language.

An example embodiment of the present disclosure provides a speech recognition apparatus comprising:
    a recognition module that performs speech recognition on an inputted speech to obtain a first text;
    a correction module that corrects the first text according to an obtained mapping relationship between words in different languages to obtain at least one second text; and
    an output module that outputs the first text in response to determining that the at least one second text corresponds to the same language.

An example embodiment of the present disclosure provides an electronic device comprising a processor and a memory, wherein the memory stores thereon computer-readable instructions which, when executed by the processor, enables the processor to at least execute the speech recognition method described herein.

An example embodiment of the present disclosure provides a non-transitory machine-readable storage medium. The non-transitory machine-readable storage medium stores thereon computer-readable instructions which, when executed by a processor of an electronic device, enables the processor to at least execute the speech recognition method described herein.

An example embodiment of the present disclosure provides a translation method comprising:
    performing speech recognition on a speech needing to be translated to obtain a first text, wherein the first text corresponds to a first language;
    correcting the first text according to an obtained mapping relationship between words in different languages to obtain at least one second text; and
    translating the first text into a second language in response to determining that words contained in the at least one second text all correspond to the first language.

An example embodiment of the present disclosure provides a translation apparatus comprising:
    a recognition module that performs speech recognition on a speech needing to be translated to obtain a first text, wherein the first text corresponds to a first language;
    a correction module that corrects the first text according to an obtained mapping relationship between words in different languages to obtain at least one second text; and
    a translation module that translates the first text into a second language in response to determining that words contained in the at least one second text all correspond to the first language.

An example embodiment of the present disclosure provides an electronic device comprising a processor and a memory, wherein the memory stores thereon computer-readable instructions which, when executed by the processor, enables the processor to at least execute the translation method described herein.

In the example embodiments of the present disclosure, speech recognition is firstly performed on a speech (the speech may be a multilingual or monolingual speech) requiring speech recognition using a general-purpose ASR system to obtain a recognition result. The recognition result is assumed to be a first text. Then, according to an obtained mapping relationship between words in different languages, the first text is corrected to obtain at least one second text. The mapping relationship represents that a certain word of language A shall correspond to a certain word of language B. The mapping relationship may be obtained through learning of a large number of speech samples containing different languages. If the corrected at least one second text corresponds to the same language, it indicates that the inputted speech is very likely to be a monolingual speech. At this time, the recognition result of the ASR system, namely the first text, is output as the final recognition result. By combining the mapping relationships between words in different languages in correcting the ASR recognition result, the present disclosure ensures the accuracy of the final speech recognition result.

BRIEF DESCRIPTION OF DRAWINGS

To illustrate the technical solutions in the example embodiments of the present disclosure more clearly, the following briefly introduces the accompanying drawings for describing the example embodiments. Apparently, the accompanying drawings in the following description only represent some example embodiments of the present disclosure, and those skilled in the art may still derive other accompanying drawings from these accompanying drawings without creative efforts.

DETAILED DESCRIPTION

Figure 1:
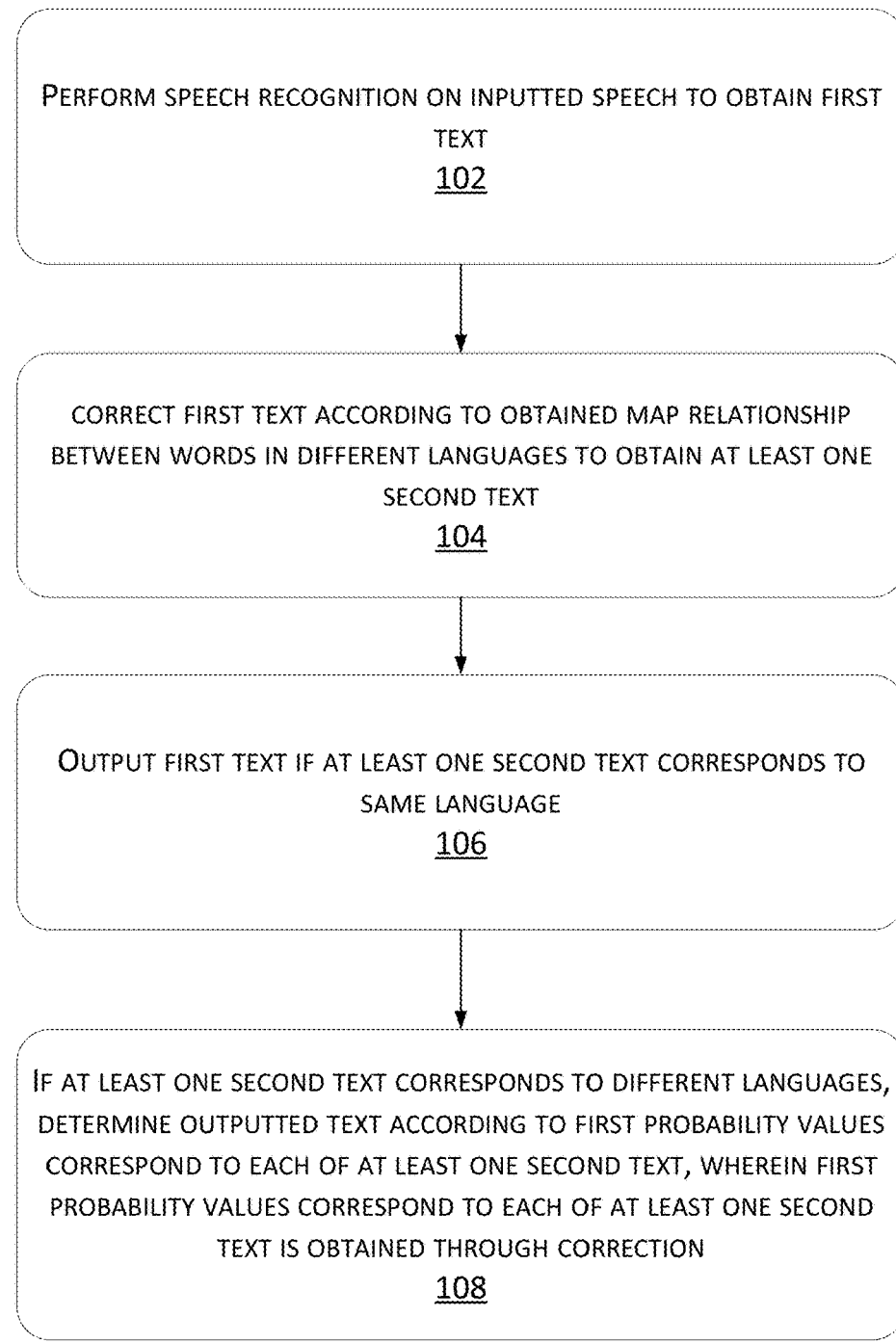
FIG. 1 shows a flowchart of a speech recognition method according to an example embodiment of the present disclosure.

In order to make the objects, technical solutions, and advantages of the example embodiments of the present disclosure clearer, the technical solutions in the example embodiments of the present disclosure will be described hereinafter in conjunction with the drawings in the example embodiments of the present disclosure. Apparently, the described example embodiments are a part of the example embodiments of the present disclosure, rather than all example embodiments. All other example embodiments obtainable by a person skilled in the art based on the example embodiments of the present disclosure without creative efforts fall within the protection scope of the present disclosure.

The terminology used in the example embodiments of the present disclosure are for the purpose of describing particular example embodiments only, and are not intended to limit the present disclosure. Unless otherwise noted in the context, the singular forms "a", "an", "the" and "said" used in the example embodiments and appended claims of the present disclosure are also intended to represent plural forms thereof "A plurality of" generally includes at least two.

Depending on the context, the term "if" as used herein may be interpreted as "when" or "in the case that" or "in response to a determination" or "in response to a detection". Similarly, depending on the context, the phrase "if determined" or "if detected (stated condition or event)" may be interpreted as "when determined," or "in response to a determination," or "when detected (stated condition or event)," or "in response to detecting (stated condition or event)."

It should also be noted that the term "comprise", "include", or any other variant thereof is intended to encompass a non-exclusive inclusion, so that a product or system that involves a series of elements comprises not only those elements, but also other elements not explicitly listed, or elements that are inherent to such a product or system. Without more restrictions, an element defined by the phrase "comprising a . . . " does not exclude the presence of another same element in the product or system that comprises the element.

In addition, the sequence of steps in the following method example embodiments is only an example, and is not to impose a strict limitation.

The speech recognition method provided by the example embodiments of the present disclosure may be executed by an electronic device, and the electronic device may be a terminal device like a PC, a notebook computer, and the like, or it may be a server. The server may be a physical server comprising an independent host, or a virtual server hosted by a host cluster, or it may be a cloud server.

The speech recognition method provided by the example embodiments of the present disclosure may be applicable to monolingual or multilingual speech recognition. For example, a speech may include content only in Chinese; and for another example, a speech may include content in both Chinese and English.

The execution process of the speech recognition method is described below in conjunction with the following example embodiments.

FIG. 1 shows a flowchart of a speech recognition method according to an example embodiment of the present disclosure. As shown in FIG. 1, the method comprises the following steps:

102. Perform speech recognition on an inputted speech to obtain a first text.

The inputted speech refers to a speech that requires speech recognition, and the speech may correspond to a plurality of languages or a single language.

A general-purpose ASR system may be used to recognize the inputted speech to obtain a recognition result, which is assumed to be the first text.

Herein, the general-purpose ASR system may be a certain language-specific speech recognition system generated in advance. For example, assuming that the general-purpose ASR system is a speech recognition system generated in advance for language A; then when a currently inputted speech includes language A and language B, the ASR system may still be used to recognize the inputted speech to obtain the first text; the first text obtained at this time, however, is likely to be inaccurate. It is appreciated that at this time, the first text is a text composed of words corresponding to language A.

Figure 2:
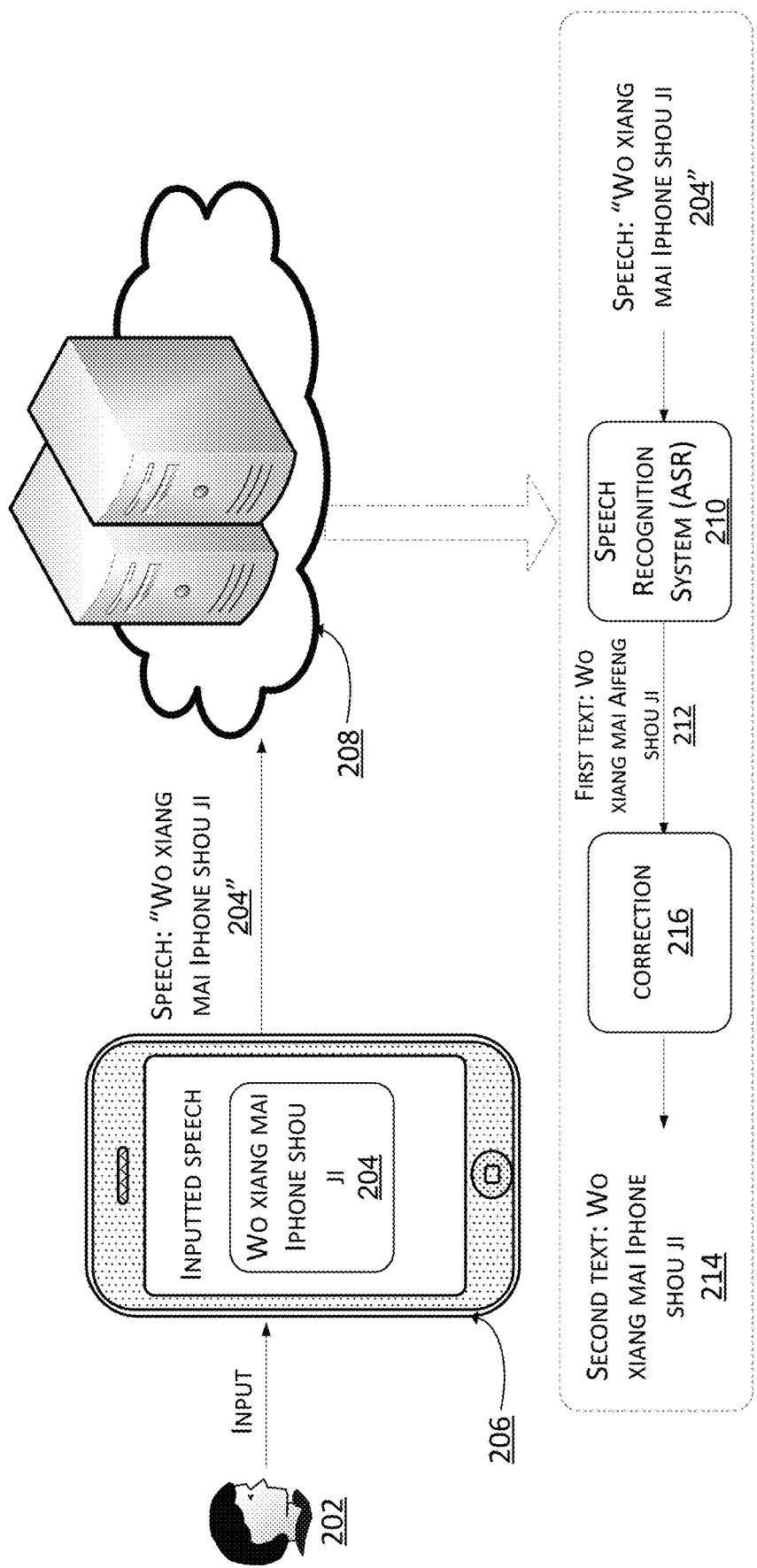
FIG. 2 shows a schematic diagram of an application scenario for a speech recognition method according to an example embodiment of the present disclosure.

For example, as shown in FIG. 2, assuming that a user 202 inputs an inputted speech "Wo Xiang Mai iPhone Shou Ji" 204 in a mix of Chinese and English (which means "I want to buy iPhone mobile phone" in English) via a mobile device 206. The speech "Wo Xiang Mai iPhone Shou Ji" 204 in audio is transmitted from the mobile device 206 to one or more servers 208 for speech recognition processing. The first text obtained through speech recognition using the general-purpose ASR system 210 may be "Wo Xiang Mai Aifeng mobile phone" 212. Apparently, the first text is erroneous as iPhone in English is erroneously translated to Aifeng in Chinese. The correct recognition result should be "Wo Xiang Mai iPhone Shou Ji". Thus, the first text "Wo Xiang Mai Aifeng Shou Ji" 212 is corrected to a second text "Wo Xiang Mai iPhone Shou Ji" 214 via correction 216.

It will be appreciated that during a normal operation of the ASR system, for the inputted speech, the ASR system would in fact predict a plurality of texts corresponding to the inputted speech and probability values corresponding to each of the plurality of texts. On the basis of this, the first text may be considered to be the text, among the plurality of texts, having the largest probability value. In other words, the text most likely predicted by the ASR system is used as the initial speech recognition result of the inputted speech: namely the first text.

104. Correct the first text according to an obtained mapping relationship between words in different languages to obtain at least one second text.

The inputted speech may contain a plurality of languages. Therefore, in order to obtain an accurate speech recognition result, after the first text is obtained, the first text may be corrected according to the obtained mapping relationship between words in different languages to obtain at least one second text.

Here, language A and language B are used as examples. The mapping relationship reflects a correspondence between a certain word of language A and a certain word of language B. For example, in the previous example, the word "iPhone" in English corresponds to the word "Aifeng" in Chinese; on the basis of this, "Wo Xiang Mai Aifeng Shou Ji" as the first text may be corrected during the correction process and changed into "Wo Xiang Mai iPhone Shou Ji" as the second text.

In reality, one certain word of language A may correspond to more than one word in language B; and the first text may contain more than one word having a mapping relationship with words in other languages. Therefore, the number of second texts obtained by correcting the first text may not be one. In the process of correcting the first text, along with the output of at least one second text, probability values corresponding to each of the second texts may be obtained at the same time; the probability value indicates how probable the first text is corrected to the corresponding second text.

In fact, the afore-mentioned mapping relationship may be obtained through learning of a large number of speech samples containing different languages; the process of acquiring the mapping relationship will be described in detail in subsequent example embodiments.

106. Output the first text if the at least one second text corresponds to the same language.

Whether the at least one second text corresponds to the same language refers to whether the at least one second text consists of words in the same language.

Whether each second text corresponds to the same language may be determined by identifying the character characteristics of the text contained in each second text. In other words, if the character characteristics of each second text are the same, for example, all conforming to the Chinese character characteristics, it may then be determined that each second text corresponds to the same language, namely Chinese.

If each second text corresponds to the same language, it indicates that the inputted speech is very likely to be a monolingual speech. At this time, the recognition result of the ASR system, i.e., the first text, is outputted as the final recognition result.

108. If the at least one second text corresponds to different languages, determine an outputted text according to first probability values corresponding to each of the at least one second text, wherein the first probability values corresponding to each of the at least one second text is obtained through correction.

If each of the second texts corresponds to different languages, it means that the inputted speech is very likely to contain a multilingual speech. At this time, for example, the final outputted text may be determined from each second context obtained in conjunction with the probability values (i.e., the afore-mentioned first probability values) corresponding to each second text obtained through correction. For example, the second text having the largest first probability value may be determined as the final outputted text.

To summarize, by combining the mapping relationships between words in different languages in correcting the ASR result, the present disclosure may ensure the accuracy of the final speech recognition result.

It is worth noting that different languages herein can be understood as entirely different types of languages.

For example, different languages may also be understood as different dialects of the same type of language. At this time, the mapping relationship between words in different languages may refer to the mapping relationship between words in different dialects of the same language. Therefore, that the at least one second text corresponds to the same language refers to that the at least one second text corresponds to the same dialect in the same language.

Based on this, the solution may also be used for speech recognition for someone who has a strong accent and uses a dialect in his/her utterances.

Figure 3:
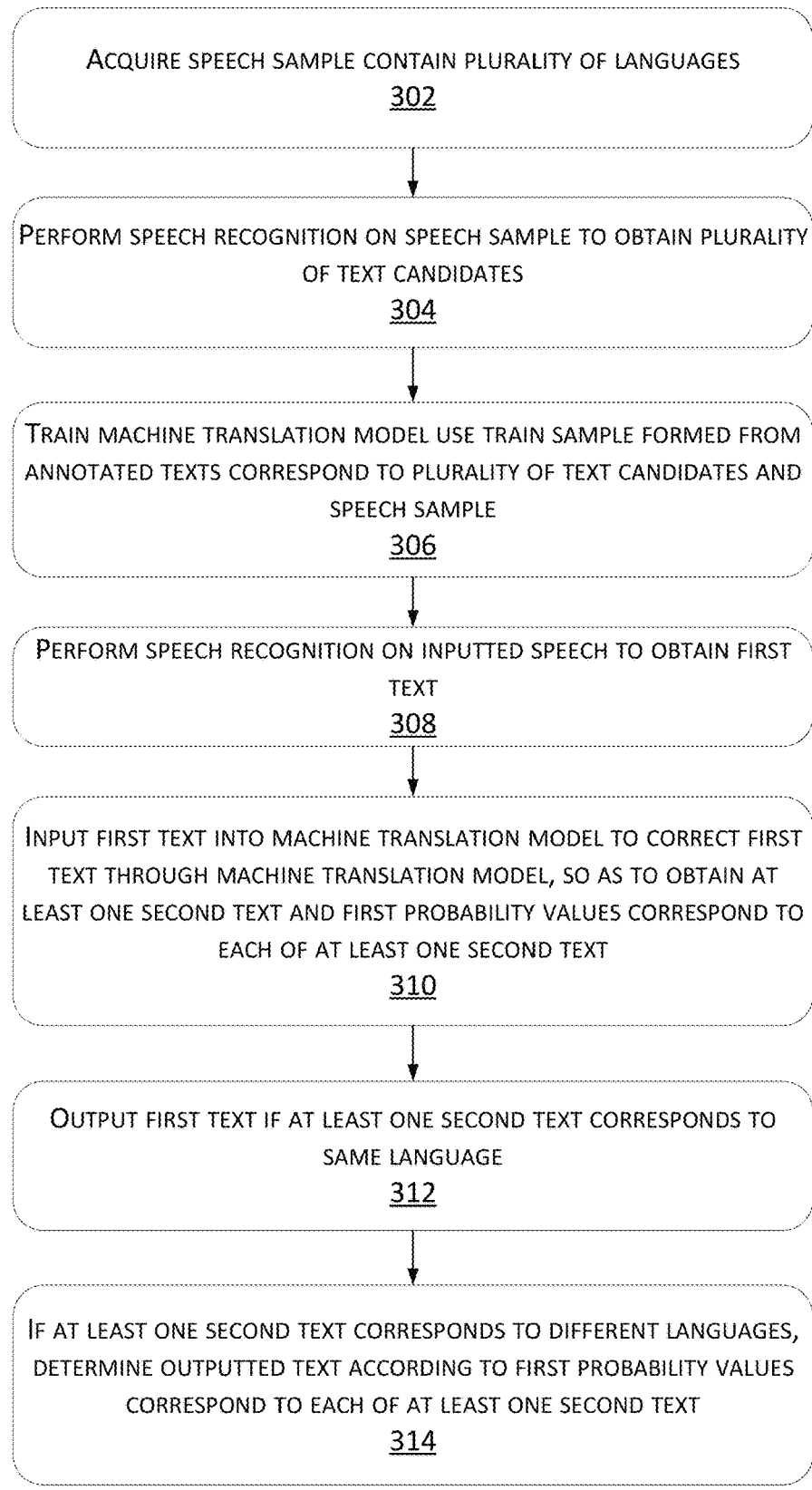
FIG. 3 shows a flowchart of another speech recognition method according to an example embodiment of the present disclosure.

FIG. 3 shows a flowchart of another speech recognition method according to an example embodiment of the present disclosure. As shown in FIG. 3, the method comprises the following steps:

302. Acquire a speech sample containing a plurality of languages.

304. Perform speech recognition on the speech sample to obtain a plurality of text candidates.

306. Train a machine translation model using a training sample formed from annotated texts corresponding to the plurality of text candidates and the speech sample.

308. Perform speech recognition on an inputted speech to obtain a first text.

310. Input the first text into the machine translation model to correct the first text through the machine translation model, so as to obtain at least one second text and first probability values corresponding to each of the at least one second text.

312. Output the first text if the at least one second text corresponds to the same language.

314. If the at least one second text corresponds to different languages, determine an outputted text according to the first probability values corresponding to each of the at least one second text.

In this example embodiment, a machine translation model is pre-trained for correcting the first text.

Based on the machine translation model, a multilingual speech recognition becomes a correction. Particularly, the first text obtained through initial recognition of the ASR system is corrected, such that the first text, which might be erroneous, may be corrected to be a correct text. The correction may be further understood as translation, which involves a process of translating an erroneous sentence into a correct sentence, thereby achieving accurate multilingual speech recognition through training one machine translation model.

The machine translation model may be a neural machine translation model, namely a machine translation model built based on a neural network. Similar to common translation models, the machine translation model provided in the example embodiment may be composed of an encoder and a decoder; both the encoder and the decoder may comprise any one of the following neural network models: a recurrent neural network (RNN) model, a long short-term memory network (LSTM) model, or a bi-directional long short-term memory network (Bi-LSTM) model.

Figure 4:
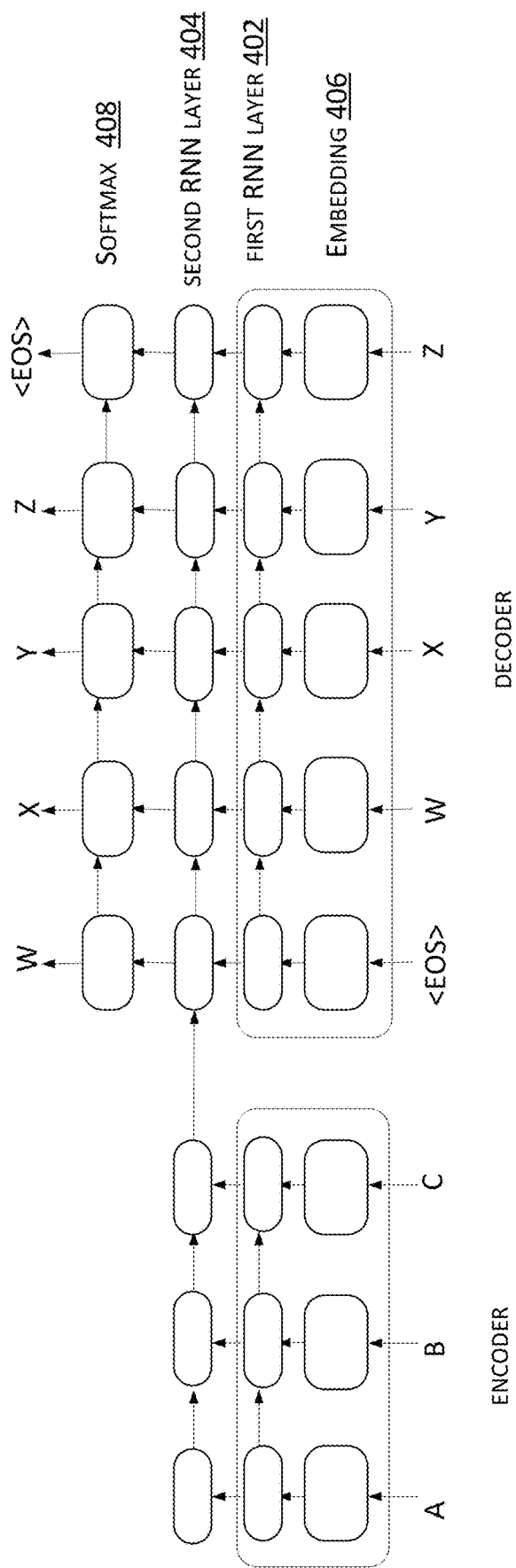
FIG. 4 shows a schematic structure diagram of a machine translation model according to an example embodiment of the present disclosure.

As shown in FIG. 4, a machine translation model based on the RNN model is illustrated. It is assumed that the machine translation model comprises an input layer, a hidden layer composed of two RNN layers including a first RNN layer 402 and a second RNN layer 404, and an output layer. Herein, the input layer is represented as embedding 406, which is used to encode word embeddings of the inputted text; the output layer is represented as softmax 408, which is used to output the prediction result; and the two RNN layers are represented as a first RNN layer and a second RNN layer. In FIG. 4, assuming that the inputted text at the encoder includes three words: A, B, and C, then the decoder decodes and outputs a text including the following four words: W, X, Y, and Z; <EOS> is a configured symbol indicating start and end positions.

In order to implement the training of the machine translation model, a large number of speech samples containing a plurality of languages need to be obtained first. In practical applications, the speech samples containing a plurality of languages may be acquired according to actual needs. Afterwards, with regard to each speech sample, the afore-mentioned general-purpose ASR system is used for speech recognition; and the obtained plurality of texts corresponding to each speech sample are used as a plurality of text candidates. Then, a machine translation model is trained using a training sample formed from annotated texts corresponding to the plurality of text candidates and the speech sample.

Any speech sample i is used as an example for illustration; assuming that the speech sample i is inputted into the ASR system, and the ASR system predicts a plurality of possible text recognition results corresponding to the speech sample i. It is assumed that a total of three types of texts are recognized, respectively represented as: a1, a2, and a3. It is also assumed that predicted probabilities corresponding to these three texts are respectively Pa1, Pa2, and Pa3. In addition, the true and accurate recognition result corresponding to the speech sample i can be manually annotated, which is assumed to be text a0. Therefore, based on the speech recognition result and the annotation result, the following three training samples may be obtained: <a1, a0>, <a2, a0>, and <a3, a0>.

Based on the obtained training samples, the machine translation model may undergo a supervised supervision, i.e., the plurality of text candidates are sequentially inputted into the encoder of the machine translation model, and semantic vectors representing context semantics of each text candidate will be obtained through the encoding process of the encoder. The decoder decodes the semantic vectors to obtain the translation result that corresponds to the text candidates, i.e., the correction result, compares the correction result with the annotation texts corresponding to the text candidates to obtain a loss function, and adjusts parameters of the machine translation model through feedback adjustment. The process is iterated and the machine translation model is trained until convergence.

It should be appreciated that when the speech sample includes language A and language B, the annotated texts then include text content corresponding to language A and language B. In this case, even if the ASR result of the speech sample, i.e., a plurality of text candidates, is erroneous, the supervision of the annotated texts enables the machine translation model to learn the correcting ability, which is reflected as the afore-mentioned mapping relationship between words in different languages. Therefore, accurate multilingual speech recognition may be achieved based on the correcting ability that the machine translation model learns.

In short, the process of using the machine translation model is as follows: for the currently inputted speech that requires speech recognition, an initial speech recognition result, namely the first text, is obtained through the ASR system; then, the first text is inputted to the machine translation model which corrects the first text based on the learned correcting ability, and outputs at least one second text and first probability values corresponding thereto. Furthermore, it is determined whether all the outputted second texts correspond to the same language. If the outputted second texts correspond to the same language, the initial recognition result obtained through the ASR system, namely the first text, is outputted as the final speech recognition result. If the outputted second texts correspond to different languages, the first probability values corresponding to each second text may be used to select, from the second texts, a second text as the final speech recognition result. For example, the final speech recognition result is determined to be the second text having the largest first probability value.

Figure 5:
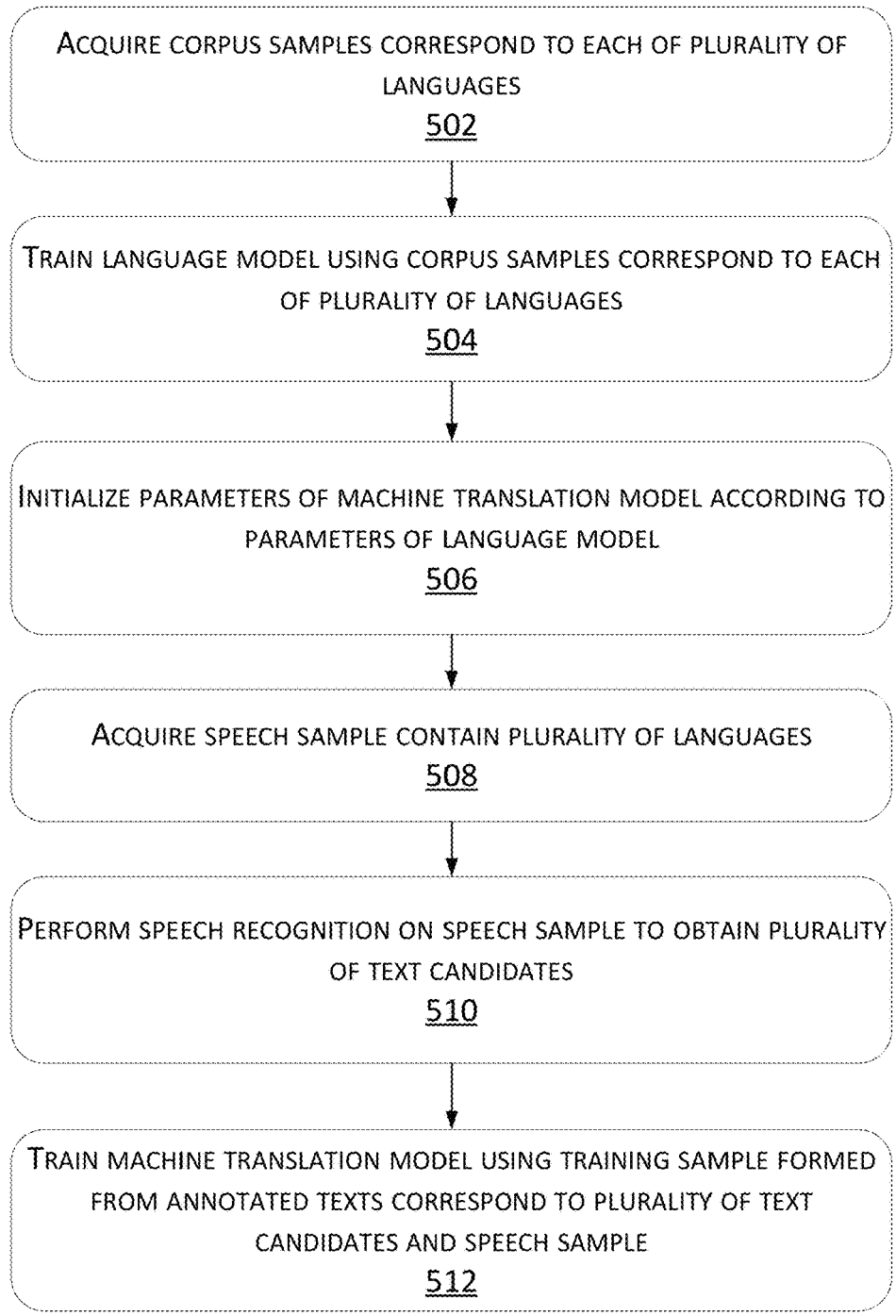
FIG. 5 shows a flowchart of a machine translation model training process according to an example embodiment of the present disclosure.

FIG. 5 shows a training process flowchart of a machine translation model according to an example embodiment of the present disclosure. As shown in FIG. 5, the process may comprise the following steps:

502. Acquire corpus samples corresponding to each of a plurality of languages.

504. Train a language model using the corpus samples corresponding to each of the plurality of languages.

506. Initialize parameters of the machine translation model according to parameters of the language model.

508. Acquire a speech sample containing a plurality of languages.

510. Perform speech recognition on the speech sample to obtain a plurality of text candidates.

512. Train the machine translation model using a training sample formed from annotated texts corresponding to the plurality of text candidates and the speech sample.

In this example embodiment, in order to enhance the training efficiency of the machine translation model and the correcting ability learned thereby, a language model is first trained so as to train the machine translation model in combination with the language model.

Specifically, assuming that the machine translation model is trained to ensure the accuracy of speech recognition results for speech that contains language A and language B, then the training of the language model may include collecting at least a corpus sample corresponding to language A and a corpus sample corresponding to language B.

It should be appreciated that the speech sample herein refers to data in an audio format, and the corpus sample herein refers to data in a text format.

In addition, it is worth noting that when language A is used as an example, the corpus sample corresponding to language A refers to that most of the content included therein is text corresponding to language A. The content included in the corpus sample, however, does not have to be limited to corresponding to language A exclusively.

The role of the language model is to predict the occurrence probability of an utterance (i.e., each corpus sample). The probability is determined by conditional probabilities corresponding to each word contained in the utterance. The conditional probability corresponding to the i-th word may be understood as, under the condition that all words (the previous i-1 words) occur before the word, the predicted probability of the next occurring word being the i-th word.

The training process of the language model may be implemented by referring to existing relevant technologies, which is not repeated in the example embodiment. In the example embodiment, it is only emphasized that the language model is trained based on a large number of corpus samples corresponding to different languages. As a result, in the process of training the language model, a dictionary including words in different languages may be created. Based on the dictionary, when it is assumed that the previous i-1 words of a corpus sample have been already predicted, then when the i-th word is to be predicted, in simple terms, it is to predict the probability of using words in each language contained in the dictionary for the i-th word. Based on this, it is understandable that the language model finally obtained through training can learn semantic vector representations corresponding to a plurality of languages.

After the language model is trained, parameter initialization may be performed for the machine translation model according to the language model. That is, parameters of the language model may be used to initialize parameters of the machine translation model. For example, in the machine translation model shown in FIG. 3, the parameters of the language model may be used to initialize the parameters of the input layer and the first RNN layer of the machine translation model, which may be considered as using the language model as the input layer and the first RNN layer of the machine translation model.

Training the machine translation model based on the language model, on the one hand, enhances the training efficiency of the machine translation model when compared with randomly initializing the parameters of the machine translation model; on the other hand, since the language model may learn contextual semantics between words in different languages, the machine translation model is enabled to combine the contextual semantics of words to improve the correcting ability.

In the example embodiments of the present disclosure, the language model may be specifically implemented as an n-gram language model, an RNN-based language model, or the like.

Figure 6:
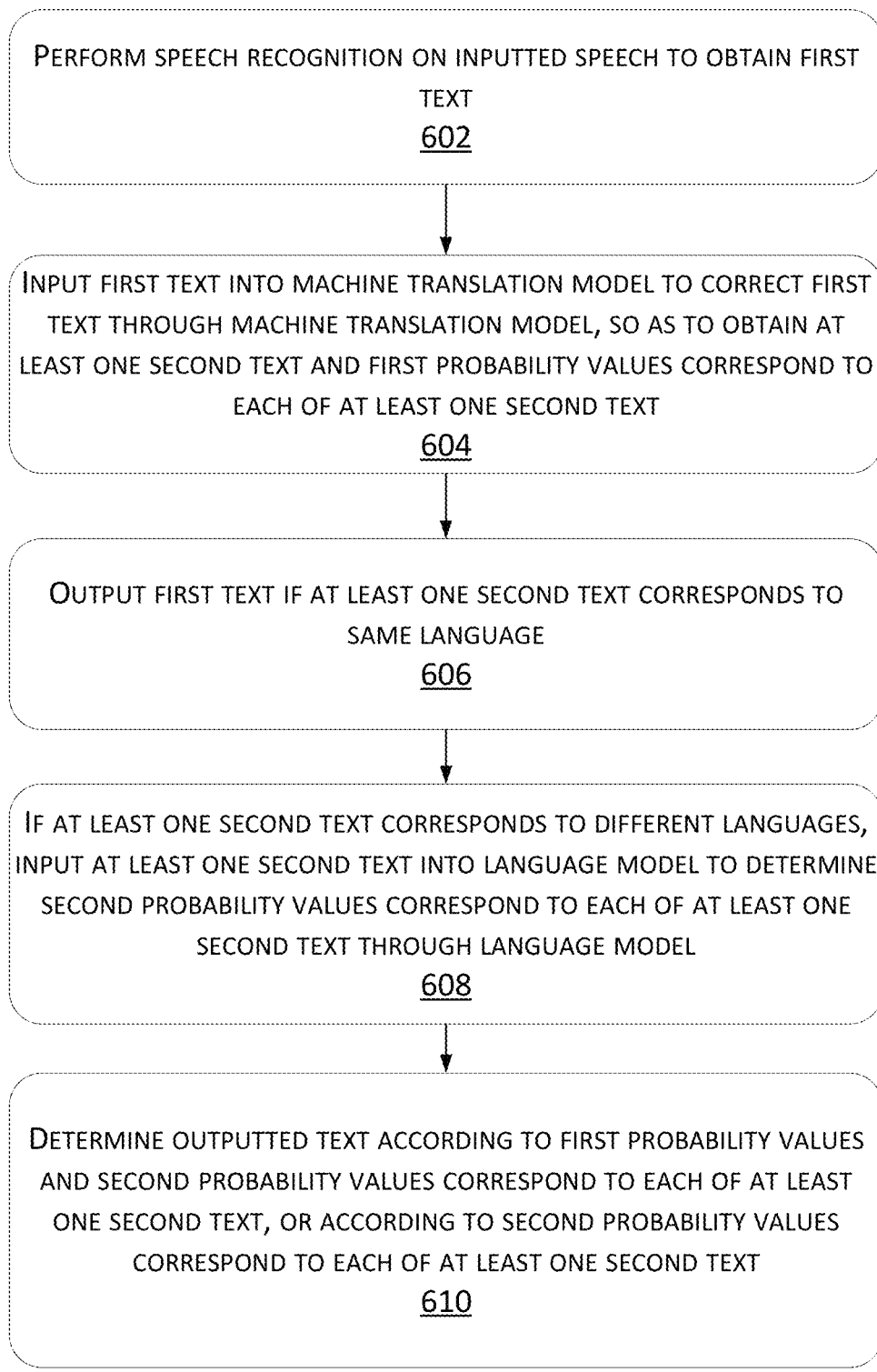
FIG. 6 shows a flowchart of another speech recognition method according to an example embodiment of the present disclosure.

Based on the language model and the machine translation model obtained through training, an example embodiment of the present disclosure further provides a speech recognition solution as shown in FIG. 6.

FIG. 6 shows a flowchart of another speech recognition method according to an example embodiment of the present disclosure. As shown in FIG. 6, the method comprises the following steps:

602. Perform speech recognition on an inputted speech to obtain a first text.

604. Input the first text into the machine translation model to correct the first text through the machine translation model, so as to obtain at least one second text and first probability values corresponding to each of the at least one second text.

606. Output the first text if the at least one second text corresponds to the same language.

608. If the at least one second text corresponds to different languages, input the at least one second text into a language model to determine second probability values corresponding to each of the at least one second text through the language model.

610. Determine the outputted text according to the first probability values and the second probability values corresponding to each of the at least one second text, or according to the second probability values corresponding to each of the at least one second text.

In this example embodiment, when it is determined that the at least one second text predicted by the machine translation model corresponds to different languages, the at least one second text may be separately inputted into the language model to predict the second probability values corresponding to each second text through the language model, which is equivalent to further rate the reasonableness of each second text by combining the context semantics that the language model learns. The reasonableness is reflected as how reasonable the grammar and semantics are.

For example, in step 610, the determining the outputted text according to the second probability values corresponding to each of the at least one second text may be implemented as:

if the first text is consistent with a second text having the largest second probability value, outputting the first text; and if the first text is inconsistent with the second text having the largest second probability value, outputting the second text having the largest second probability value.

For example, in step 610, the determining the outputted text according to the first probability values and the second probability values corresponding to each of the at least one second text may be implemented as:

if the first text is consistent with a second text having the largest summed probability value, outputting the first text; and If the first text is inconsistent with the second text having the largest summed probability value, outputting the second text having the largest summed probability value, wherein for any second text j, the summed probability value refers to a weighted sum of the first probability value and the second probability value corresponding to the second text j.

In practical applications, a weighted coefficient may be configured in advance. For example, in practical applications, the weighted coefficient may be determined according to the ratio of a total number of training samples corresponding to the language model to a total number of training samples corresponding to the machine translation model. For example, if the ratio of the total number of training samples of the language model to the total number of training samples of the machine translation model is 8:2, the weighted coefficient corresponding to the first probability value may be set to 0.2, and the weighted coefficient corresponding to the second probability value may be set to 0.8.

In view of the above, accurate multilingual speech recognition may be achieved using the afore-mentioned speech model and machine translation model.

A speech recognition apparatus in one or a plurality of example embodiments of the present disclosure will be described in detail below. A person skilled in the art may appreciate that all of these speech recognition apparatuses may be formed by configuring and using commercially available hardware components through the steps taught in this solution.

Figure 7:
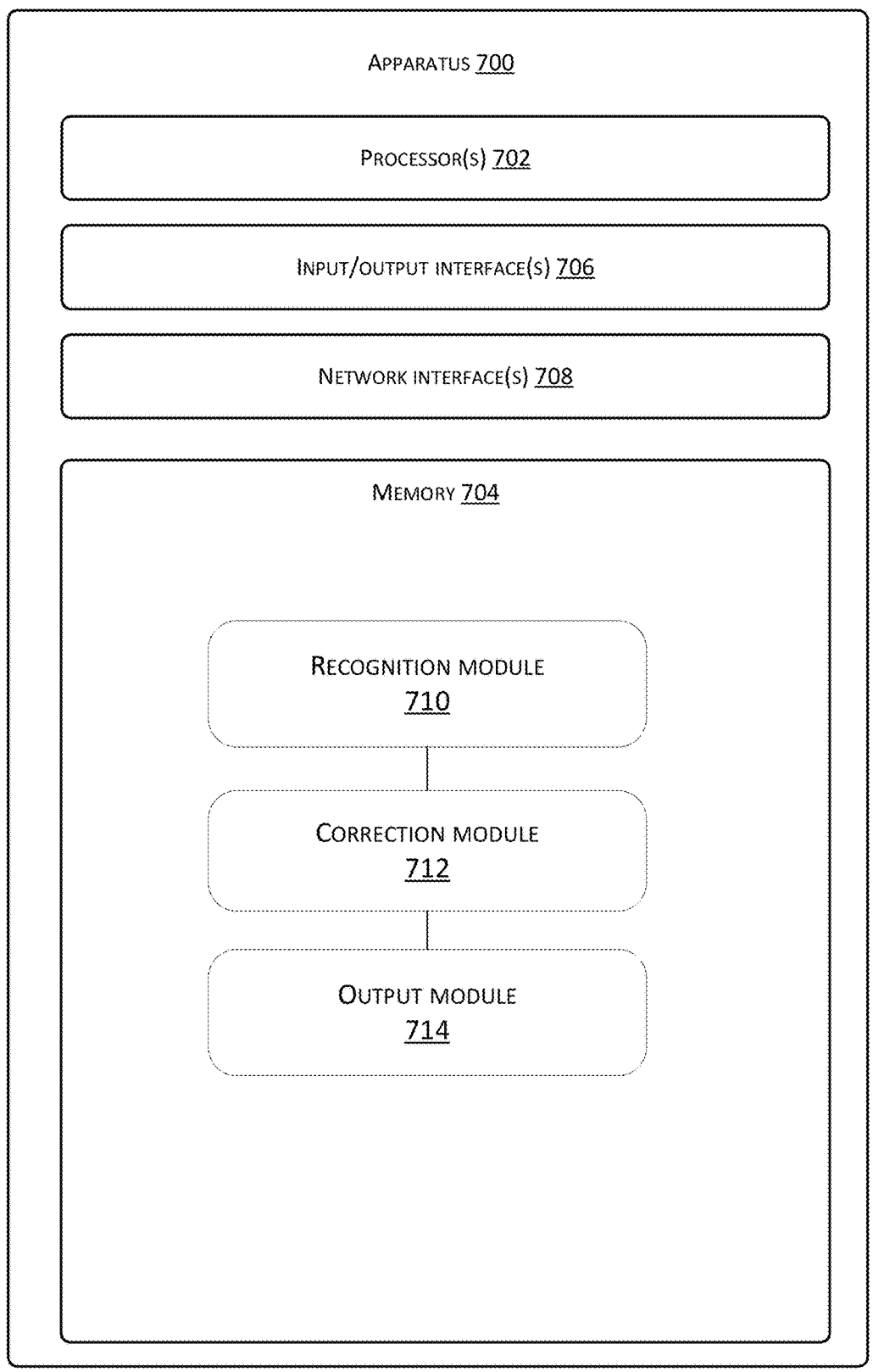
FIG. 7 shows a schematic structure diagram of a speech recognition apparatus according to an example embodiment of the present disclosure.

FIG. 7 shows a schematic structure diagram of a speech recognition apparatus according to an example embodiment of the present disclosure. As shown in FIG. 7, an apparatus 700 includes one or more processor(s) 702 or data processing unit(s) and memory 704. The apparatus 700 may further include one or more input/output interface(s) 706 and one or more network interface(s) 708.

The memory 704 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier.

The memory 704 may store therein a plurality of modules or units including: a recognition module 710, a correction module 712, and an output module 714.

The recognition module 710 is configured to perform speech recognition on an inputted speech to obtain a first text.

The correction module 712 is configured to correct the first text according to an obtained mapping relationship between words in different languages to obtain at least one second text.

The output module 714 is configured to output the first text if the at least one second text corresponds to the same language.

For example, the apparatus 700 further comprises: a machine translation model training module (not shown in FIG. 7) stored in the memory 704, configured for acquiring a speech sample containing a plurality of languages, performing speech recognition on the speech sample to obtain a plurality of text candidates, and train a machine translation model using a training sample formed from annotated texts corresponding to the plurality of text candidates and the speech sample.

Based on this, the correction module 712 is specifically configured to: input the first text into the machine translation model, so as to correct the first text through the machine translation model.

Therefore, for example, the output module 714 may be specifically configured to: if the at least one second text corresponds to different languages, determine an outputted text according to first probability values corresponding to each of the at least one second text, wherein the first probability values corresponding to each of the at least one second text is predicted by the machine translation model.

Herein, the machine translation model is composed of an encoder and a decoder, and both the encoder and the decoder may comprise any one of the following neural network models: a recurrent neural network model, a long short-term memory network model, and a bidirectional long short-term memory network model.

In addition, for example, the apparatus further comprises: a language model training module, configured to acquire corpus samples corresponding to each of the plurality of languages, train a language model using the corpus samples corresponding to each of the plurality of languages, and initialize parameters of the machine translation model according to parameters of the language model.

For example, the output module 714 may be specifically configured to determine the outputted text to be a second text having the largest first probability value.

For example, the output module 714 may be specifically configured to: input the at least one second text into the language model to determine second probability values corresponding to each of the at least one second text using the language model, wherein the language model is obtained through training by using the corpus samples corresponding to each of the plurality of languages; and the outputted text is determined according to the first probability values and the second probability values corresponding to each of the at least one second text, or according to the second probability values corresponding to each of the at least one second text.

For example, the output module 714 may be specifically configured to: output the first text if the first text is consistent with a second text having the largest second probability value; and output the second text having the largest second probability value if the first text is inconsistent with the second text having the largest second probability value.

For example, the output module 714 may be specifically configured to: output the first text if the first text is consistent with a second text having the largest summed probability value; output the second text having the largest summed probability value if the first text is inconsistent with the second text having the largest summed probability value, wherein for any second text, the summed probability value refers to a weighted sum of the first probability value and the second probability value corresponding to the any second text.

For example, the mapping relationship between words in different languages comprises a mapping relationship between words in different dialects of the same language. At this time, that the at least one second text corresponds to the same language refers to that the at least one second text corresponds to the same dialect of the same language.

The speech recognition apparatus shown in FIG. 7 may execute the methods provided in the afore-mentioned example embodiments. Reference regarding the parts that are not described in detail in this example embodiment may be made to the related description of the previous example embodiments. Details are not repeated herein.

Figure 8:
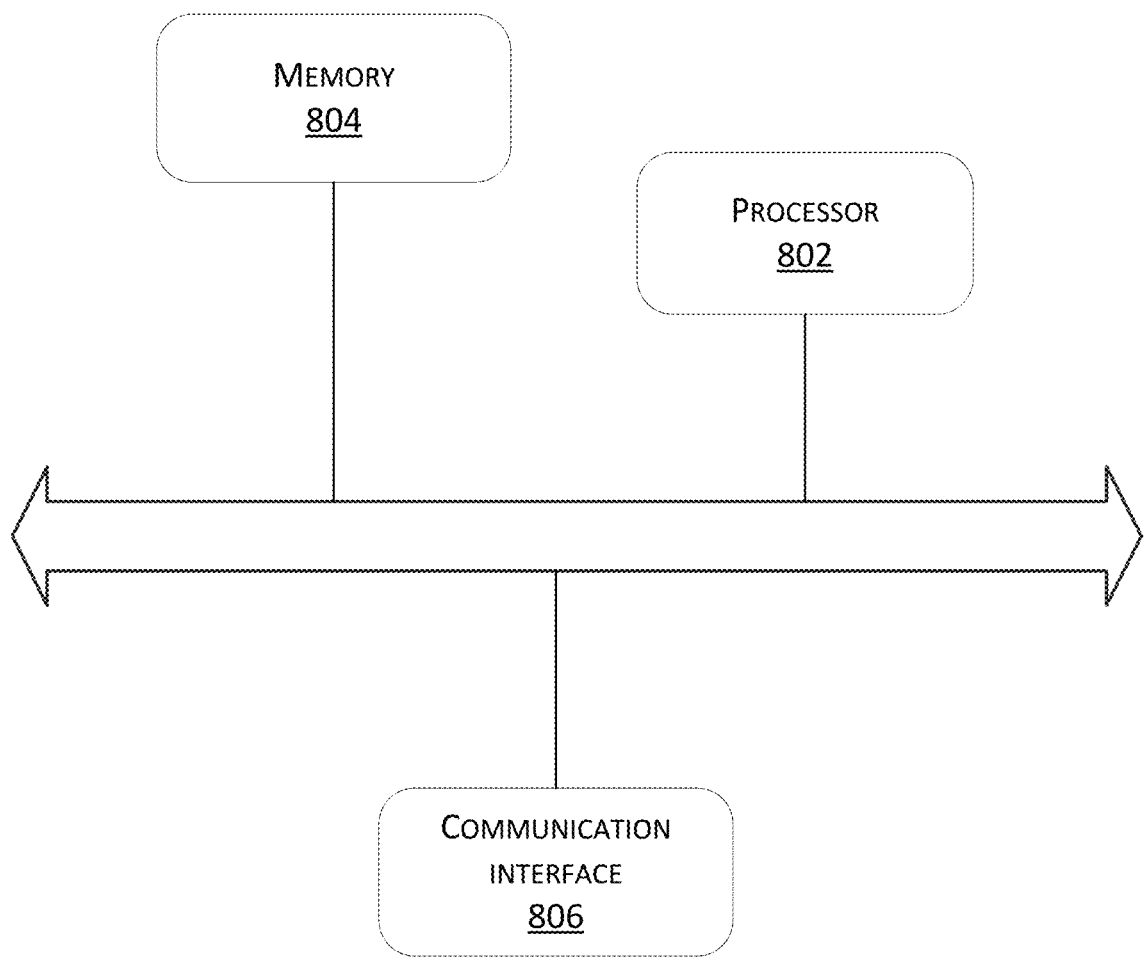
FIG. 8 shows a schematic structure diagram of an electronic device corresponding to the speech recognition apparatus according to the example embodiment shown in FIG. 7.

In one possible design, the structure of the speech recognition apparatus shown in FIG. 7 may be implemented as an electronic device. As shown in FIG. 8, the electronic device may comprise: a processor 802 and a memory 804. The memory 804 is an example of computer readable media. The memory 804 stores thereon computer-readable instructions which, when executed by the processor 802, enables at least the processor 802 to implement the speech recognition method provided in the afore-mentioned example embodiment.

The structure of the electronic device may further comprise a communication interface 806 for communicating with other devices or communication networks.

In addition, an example embodiment of the present disclosure provides a non-transitory machine-readable storage medium. The non-transitory machine-readable storage medium stores thereon computer-readable instructions which, when executed by a processor of an electronic device, enables the processor to execute the speech recognition method provided in the afore-mentioned example embodiments.

A general implementation process of the speech recognition method provided herein is described in conjunction with the above example embodiments. The speech recognition method is applicable to application scenarios such as simultaneous interpretation. As an example, the following describes the implementation process of the speech recognition method in a translation scenario with reference to FIG. 9.

Figure 9:
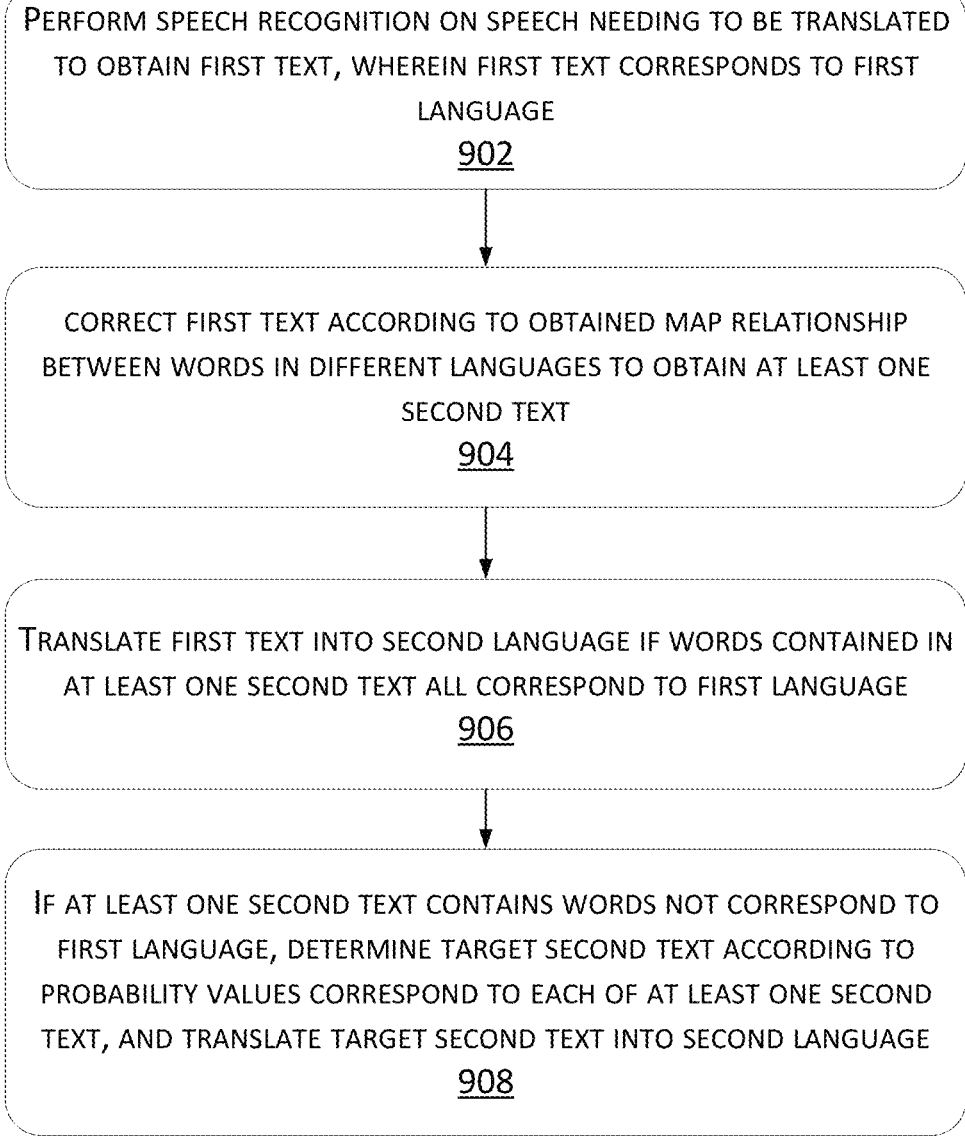
FIG. 9 shows a flowchart of a translation method according to an example embodiment of the present disclosure.

FIG. 9 shows a flowchart of a translation method according to an example embodiment of the present disclosure. As shown in FIG. 9, the method may comprise the following steps:

902. Performing speech recognition on a speech needing to be translated to obtain a first text, wherein the first text corresponds to a first language.

904. Correct the first text according to an obtained mapping relationship between words in different languages to obtain at least one second text.

906. Translate the first text into a second language if words contained in the at least one second text all correspond to the first language.

908. If the at least one second text contains words not corresponding to the first language, determine a target second text according to probability values corresponding to each of the at least one second text, and translate the target second text into the second language.

In this example embodiment, it is assumed that a speech mainly made in a first language (such as Chinese) needs to be translated into a second language (such as English). Based on this, the afore-mentioned speech needing to be translated is a speech mainly made in the first language, wherein the speech mainly made in the first language refers to that all words contained in the speech may be uttered in the first language, or it may be that some words thereof are uttered in a different language. For example, some Japanese words are mixed in a Chinese utterance.

In the process of translating the speech needing to be translated, speech recognition is performed on said speech first to convert the speech into written words, namely text; and then, the converted text is translated into a second language to obtain a translation result. Herein, depending on the actual needs, the translation result may be outputted in a text format or in a speech format. In the case of the translation result being outputted in the speech format, speech synthesis technology may be used to perform speech synthesis processing on the translated text to obtain a translated speech.

Reference with regard to the process of performing speech recognition on a speech needing to be translated to obtain a first text that corresponds to a first language, and the process of correcting the first text to obtain at least one second text may be made to the descriptions of the afore-mentioned example embodiments. Details are not repeated herein.

It is only emphasized here that since the speech is mainly made in the first language, the first text initially obtained by performing voice recognition on the speech is composed of words corresponding to the first language. In addition, the afore-mentioned mapping relationship between words of different languages comprises at least a mapping relationship between words of the first language and words of the second language. Apparently, in actual applications, a mapping relationship between words of the first language and words of other languages may also be included.

After correcting the first text to obtain at least one second text, if the at least one second text corresponds to the same language, i.e., the words contained in the at least one second text correspond to the same language, at this point, said same language is the first language to which the speech needing to be translated corresponds; then, the recognition result of the first text may be considered to be correct. At this point, the first text is treated as the object that needs to be translated, and is translated into the second language.

On the other hand, if the at least one second text does not correspond to the same language, i.e., some words contained in the at least one second text do not correspond to the first language, then it indicates that the recognition result of the first text is erroneous. In this case, a target second text can be determined as the final recognition result of the speech according to probability values corresponding to each of the at least one second text, and the target second text is translated into the second language. The process of selecting the target second text may be implemented by referring to the afore-mentioned example embodiments, which is not repeated herein.

To summarize, by combining the mapping relationship between words in different languages in correcting the speech recognition result of the speech needing to be translated, the present disclosure may ensure the accuracy of the final speech recognition result, and further ensure the accuracy of the translation result.

Figure 10:
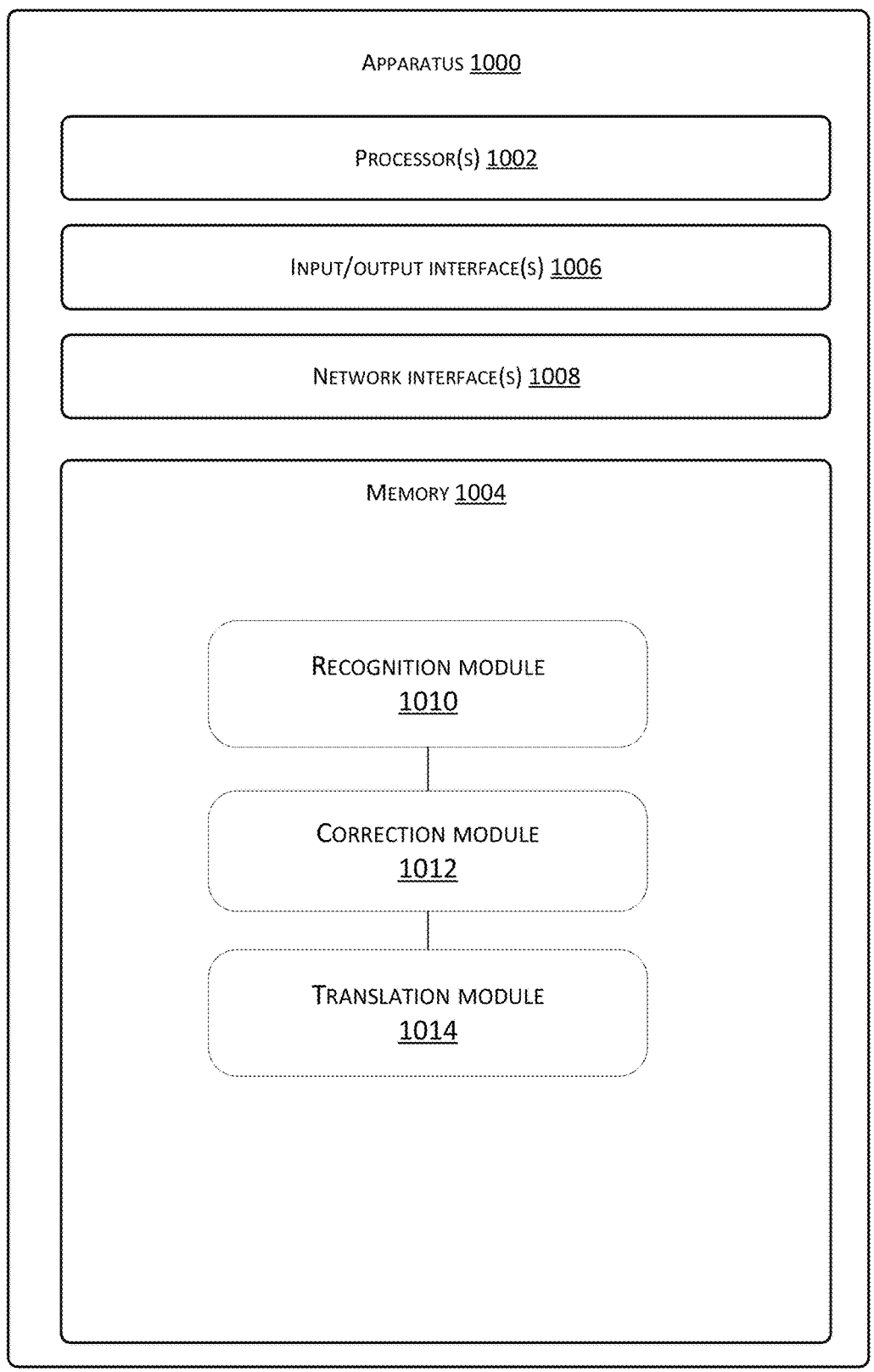
FIG. 10 shows a schematic structure diagram of a translation apparatus according to an example embodiment of the present disclosure.

FIG. 10 shows a schematic structure diagram of a translation apparatus according to an example embodiment of the present disclosure. As shown in FIG. 10, an apparatus 1000 includes one or more processor(s) 1002 or data processing unit(s) and memory 1004. The apparatus 1000 may further include one or more input/output interface(s) 1006 and one or more network interface(s) 1008.

The memory 1004 is an example of computer readable media. The memory 1004 may store therein a plurality of modules or units including: a recognition module 1010, a correction module 1012, and a translation module 1014.

The recognition module 1010 is configured to perform speech recognition on a speech needing to be translated to obtain a first text, wherein the first text corresponds to a first language.

The correction module 1012 is configured to correct the first text according to an obtained mapping relationship between words in different languages to obtain at least one second text.

The translation module 1014 is configured to translate the first text into a second language if words contained in the at least one second text all correspond to the first language.

For example, the translation module 1014 is further configured to: if the at least one second text contains words not corresponding to the first language, determine a target second text according to probability values corresponding to each of the at least one second text, and translate the target second text into the second language.

The translation apparatus shown in FIG. 10 may execute the method provided in the example embodiment shown in FIG. 9. Reference regarding the parts that are not described in detail in this example embodiment may be made to the related description of the example embodiment shown in FIG. 9. Details are not repeated herein.

Figure 11:
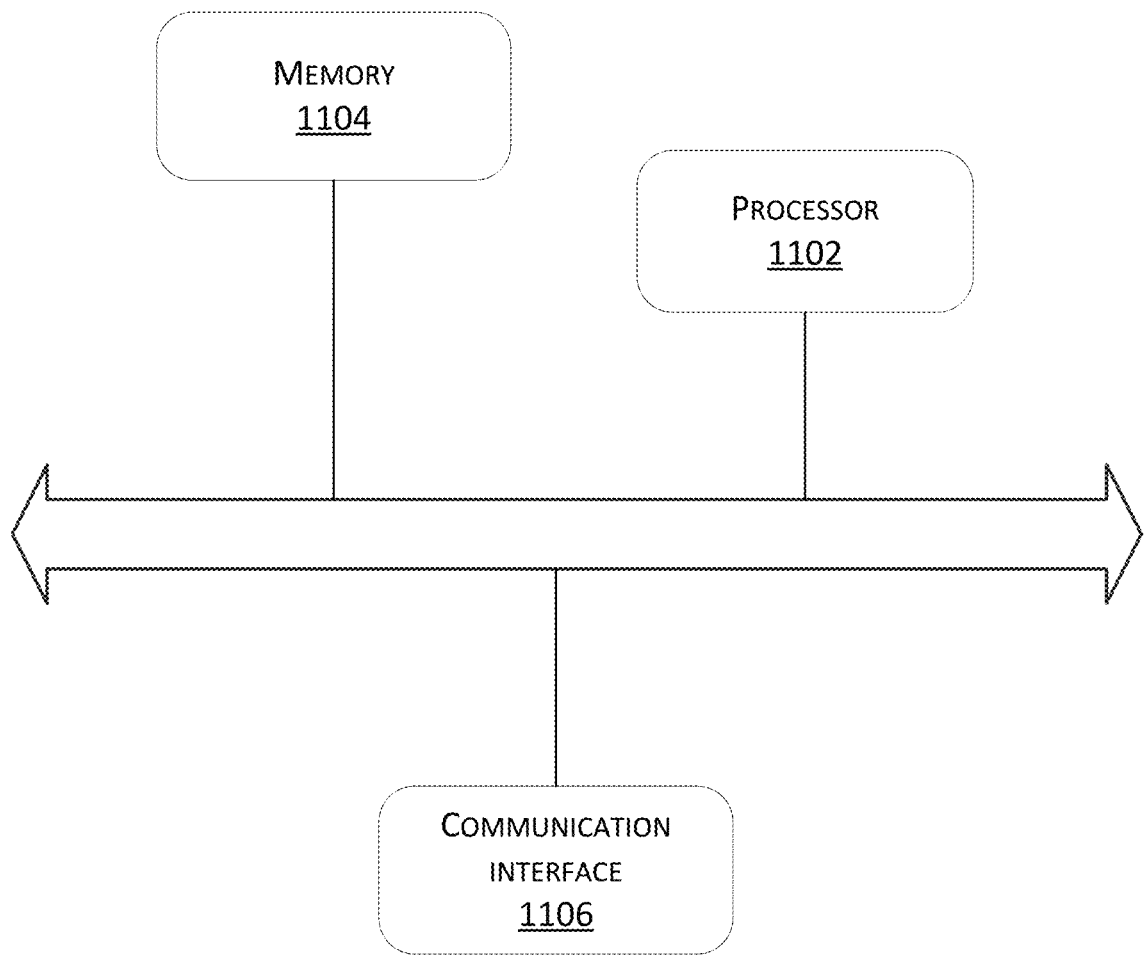
FIG. 11 shows a schematic structure diagram of an electronic device corresponding to the translation apparatus according to the example embodiment shown in FIG. 10.

In one possible design, the structure of the translation apparatus shown in FIG. 10 may be implemented as an electronic device. As shown in FIG. 11, the electronic device may comprise: a processor 1102 and a memory 1104. The memory 1104 stores thereon computer-readable instructions which, when executed by the processor 1102, enables at least the processor 1102 to implement the translation method provided in the example embodiment shown in FIG. 9.

The structure of the electronic device may further comprise a communication interface 1106 for communicating with other devices or communication networks.

The apparatus example embodiments described above are for illustrative purposes only, wherein each module described as a separate component may or may not be physically separated. Some or all of the modules may be selected according to actual needs to achieve the object of the solution of the example embodiments. Those skilled in the art may understand and implement the example embodiment without creative efforts.

Through the description of the above implementations, those skilled in the art may clearly understand that each implementation may be achieved by means of a necessary general hardware platform, and may certainly be implemented by a combination of hardware and software. Based on such an understanding, the part of the technical solution of the present application, which is essential or contributes to the prior art, can be embodied in the form of a software product. The present disclosure may take the form of a computer program product which is embodied on one or more computer-usable storage media (including, but not limited to, disk storage, CD-ROM, optical storage, and so forth) having computer-usable program code included therein.

Finally, it should be noted that the above example embodiments are merely used for illustrating, rather than limiting, the technical solutions of the present disclosure. Although the present disclosure is described in detail with reference to the afore-mentioned example embodiments, it should be understood by those of ordinary skill in the art that modifications may still be made to the technical solutions described in the afore-mentioned example embodiments, or equivalent substitutions may be applied to part of the technical features therein; and these modifications or substitutions do not cause the essence of corresponding technical solutions to depart from the spirit and scope of the technical solutions in the example embodiments of the present disclosure.

The present disclosure may further be understood with clauses as follows.

Clause 1. A speech recognition method, comprising:
  performing speech recognition on an inputted speech to obtain a first text;
  correcting the first text according to an obtained mapping relationship between words in different languages to obtain at least one second text; and
  outputting the first text if the at least one second text corresponds to a same language.

Clause 2. The method according to clause 1, wherein the method further comprises:
  acquiring a speech sample containing a plurality of languages;
  performing speech recognition on the speech sample to obtain a plurality of text candidates; and
  training a machine translation model using a training sample formed from annotated texts corresponding to the plurality of text candidates and the speech sample.

Clause 3. The method according to clause 2, wherein the step of correcting the first text comprises:
  inputting the first text into the machine translation model, so as to correct the first text through the machine translation model.

Clause 4. The method according to clause 2, wherein the machine translation model is composed of an encoder and a decoder, and both the encoder and the decoder may comprise any one of the following neural network models: a recurrent neural network model, a long short-term memory network model, and a bidirectional long short-term memory network model.

Clause 5. The method according to clause 2, wherein the method further comprises:
  acquiring corpus samples corresponding to each of the plurality of languages;
  training a language model using the corpus samples corresponding to each of the plurality of languages; and
  initializing parameters of the machine translation model according to parameters of the language model.

Clause 6. The method according to any one of clauses 3 to 5, wherein the method further comprises:
  if the at least one second text corresponds to different languages, determining an outputted text according to first probability values corresponding to each of the at least one second text, wherein the first probability values corresponding to each of the at least one second text is predicted by the machine translation model.

Clause 7. The method according to clause 6, wherein the step of determining an outputted text according to first probability values corresponding to each of the at least one second text comprises:
  determining that the outputted text is a second text having the largest first probability value.

Clause 8. The method according to clause 6, wherein the step of determining an outputted text according to first probability values corresponding to each of the at least one second text comprises:
  inputting the at least one second text into the language model to determine second probability values corresponding to each of the at least one second text using the language model, wherein the language model is obtained through training by using the corpus samples corresponding to each of the plurality of languages; and
  determining the outputted text according to the first probability values and the second probability values corresponding to each of the at least one second text, or according to the second probability values corresponding to each of the at least one second text.

Clause 9. The method according to clause 8, wherein the step of determining the outputted text according to the second probability values corresponding to each of the at least one second text comprises:

if the first text is consistent with a second text having the largest second probability value, outputting the first text; and if the first text is inconsistent with the second text having the largest second probability value, outputting the second text having the largest second probability value.

Clause 10. The method according to clause 8, wherein the step of determining the outputted text according to the first probability values and the second probability values corresponding to each of the at least one second text comprises:

if the first text is consistent with a second text having the largest summed probability value, outputting the first text; and if the first text is inconsistent with the second text having the largest summed probability value, outputting the second text having the largest summed probability value, wherein for any second text, the summed probability value refers to a weighted sum of the first probability value and the second probability value corresponding to the any second text.

Clause 11. The method according to clause 1, wherein the mapping relationship between words in different languages comprises a mapping relationship between words in different dialects of the same language; and that the at least one second text corresponds to the same language refers to that the at least one second text corresponds to a same dialect of the same language.

Clause 12. A speech recognition apparatus, comprising:

a recognition module, configured to perform speech recognition on an inputted speech to obtain a first text;

a correction module, configured to correct the first text according to an obtained mapping relationship between words in different languages to obtain at least one second text; and an output module, configured to output the first text if the at least one second text corresponds to the same language.

Clause 13. An electronic device, comprising a memory and a processor, wherein the memory stores thereon computer-readable instructions which, when executed by the processor, enables the processor to execute the speech recognition method according to any one of clauses 1-11.

Clause 14. A translation method, comprising:

performing speech recognition on a speech needing to be translated to obtain a first text, wherein the first text corresponds to a first language;

correcting the first text according to an obtained mapping relationship between words in different languages to obtain at least one second text; and translating the first text into a second language if words contained in the at least one second text all correspond to the first language.

Clause 15. The method according to clause 14, wherein the method further comprises:

if the at least one second text contains words not corresponding to the first language, determining a target second text according to probability values corresponding to each of the at least one second text; and translating the target second text into the second language.

Clause 16. A translation apparatus, comprising:

a recognition module, configured to perform speech recognition on a speech needing to be translated to obtain a first text, wherein the first text corresponds to a first language;

a correction module, configured to correct the first text according to an obtained mapping relationship between words in different languages to obtain at least one second text; and a translation module, configured to translate the first text into a second language if words contained in the at least one second text all correspond to the first language.

Clause 17. An electronic device, comprising a memory and a processor, wherein the memory stores thereon computer-readable instructions which, when executed by the processor, enables the processor to execute the translation method according to clause 14 or 15.

What is claimed is:

1. An apparatus comprising:

one or more processors; and one or more memories storing thereon computer-readable instructions that, when executed by the one or more processors, cause the one or more processors to perform acts comprising:

initializing parameters of a machine translation model according to parameters of a language model;

training the machine translation model using training samples to obtain a trained machine translation model;

performing speech recognition on an inputted speech to obtain a first text;

correcting, by inputting the first text into the trained machine translation model, the first text according to a mapping relationship between words in different languages to obtain at least one second text;

obtaining respective first probability values predicted by the trained machine translation model corresponding to respective second texts of the at least one second text; and determining an output text at least according to the respective first probability values corresponding to the respective second texts of the at least one second text, a respective first probability value representing a probability that the first text is corrected to a respective second text in the at least one second text, the determining the output text at least according to the respective first probability values corresponding to the respective second texts including:

inputting the at least one second text into the language model to determine respective second probability values corresponding to the respective second texts of the at least one second text using the language model, a respective second probability value representing a reasonableness of grammar and semantics of the respective second text;

determining the output text according to the respective first probability values and the respective second probability values corresponding to the respective second texts;

in response to determining that the first text is consistent with a particular second text having a largest summed probability value, outputting the first text, a respective summed probability value of the respective second text representing a weighted sum of the respective first probability value and the respective second probability value corresponding to the respective second text; and in response to determining that the first text is inconsistent with the particular second text having the largest summed probability value, outputting the particular second text having the largest summed probability value.

2. The apparatus according to claim 1, wherein the training the machine translation model using the training samples to obtain the trained machine translation model comprises:
acquiring a speech sample containing a plurality of languages;
performing speech recognition on the speech sample to obtain a plurality of text candidates;
forming a training sample from annotated texts corresponding to the plurality of text candidates and the speech sample; and
training the machine translation model using the training sample to obtain the trained machine translation model.

3. The apparatus according to claim 2, wherein the correcting the first text comprises:
inputting the first text into the trained machine translation model; and
correcting the first text using the trained machine translation model.

4. The apparatus according to claim 1, wherein:
the machine translation model is composed of an encoder and a decoder; and
the encoder or the decoder includes any one of neural network models including: a recurrent neural network model, a long short-term memory network model, and a bidirectional long short-term memory network model.

5. The apparatus according to claim 2, wherein the acts further comprise:
acquiring corpus samples corresponding to each of the plurality of languages; and
training the language model using the corpus samples corresponding to each of the plurality of languages.

6. The method according to claim 1, further comprising predicting the respective first probability values using the trained machine translation model.

7. The apparatus according to claim 1, wherein:
the mapping relationship between words in different languages comprises a mapping relationship between words in different dialects of a same language; and
the at least one second text corresponds to the same language refers to that the at least one second text corresponds to a same dialect of the same language.

8. The apparatus according to claim 1, wherein the acts further comprise:
in response to determining that the at least one second text includes a word not corresponding to the first language, determining a target second text according to the respective first probability values corresponding to each of the at least one second text; and
translating the target second text into a second language.

9. A method comprising:
initializing parameters of a machine translation model according to parameters of a language model;
training the machine translation model using training samples to obtain a trained machine translation model;
performing speech recognition on an inputted speech to obtain a first text;
correcting, by inputting the first text into the trained machine translation model, the first text according to a mapping relationship between words in different languages to obtain at least one second text;
obtaining respective first probability values predicted by the trained machine translation model corresponding to respective second texts of the at least one second text; and
determining an output text at least according to the respective first probability values corresponding to the respective second texts of the at least one second text, a respective first probability value representing a probability that the first text is corrected to a respective second text in the at least one second text, the determining the output text at least according to the respective first probability values corresponding to the respective second texts including:
inputting the at least one second text into the language model to determine respective second probability values corresponding to the respective second texts of the at least one second text using the language model, a respective second probability value representing a reasonableness of grammar and semantics of the respective second text;
determining the output text according to the respective first probability values and the respective second probability values corresponding to the respective second texts;
in response to determining that the first text is consistent with a particular second text having a largest summed probability value, outputting the first text, a respective summed probability value of the respective second text representing a weighted sum of the respective first probability value and the respective second probability value corresponding to the respective second text; and
in response to determining that the first text is inconsistent with the particular second text having the largest summed probability value, outputting the particular second text having the largest summed probability value.

10. The method according to claim 9, wherein the training the machine translation model using the training samples to obtain the trained machine translation model comprises:
acquiring a speech sample containing a plurality of languages;
performing speech recognition on the speech sample to obtain a plurality of text candidates;
forming a training sample from annotated texts corresponding to the plurality of text candidates and the speech sample; and
training the machine translation model using the training sample to obtain the trained machine translation model.

11. The method according to claim 10, wherein the correcting the first text comprises:
inputting the first text into the trained machine translation model; and
correcting the first text using the trained machine translation model.

12. The method according to claim 10, further comprising:
acquiring corpus samples corresponding to each of the plurality of languages; and
training the language model using the corpus samples corresponding to each of the plurality of languages.

13. The method according to claim 9, wherein:
the machine translation model is composed of an encoder and a decoder; and
the encoder or the decoder includes any one of neural network models including: a recurrent neural network model, a long short-term memory network model, and a bidirectional long short-term memory network model.

14. The method according to claim 9, wherein:
the mapping relationship between words in different languages comprises a mapping relationship between words in different dialects of a same language; and the at least one second text corresponds to the same language refers to that the at least one second text corresponds to a same dialect of the same language.

15. One or more memories storing thereon computer-readable instructions that, when executed by one or more processors, cause the one or more processors to perform acts comprising:

initializing parameters of a machine translation model according to parameters of a language model;

training the machine translation model using training samples to obtain a trained machine translation model;

performing speech recognition on a speech needing to be translated to obtain a first text;

correcting, by inputting the first text into the trained machine translation model, the first text according to a mapping relationship between words in different languages to obtain at least one second text;

obtaining respective first probability values predicted by the trained machine translation model corresponding to respective second texts of the at least one second text; and determining an output text at least according to the respective first probability values corresponding to the respective second texts of the at least one second text, a respective first probability value representing a probability that the first text is corrected to a respective second text in the at least one second text, the determining the output text at least according to the respective first probability values corresponding to the respective second texts including:

inputting the at least one second text into the language model to determine respective second probability values corresponding to the respective second texts of the at least one second text using the language model, a respective second probability value representing a reasonableness of grammar and semantics of the respective second text;

determining the output text according to the respective first probability values and the respective second probability values corresponding to the respective second texts;

in response to determining that the first text is consistent with a particular second text having a largest summed probability value, outputting the first text, a respective summed probability value of the respective second text representing a weighted sum of the respective first probability value and the respective second probability value corresponding to the respective second text; and in response to determining that the first text is inconsistent with the particular second text having the largest summed probability value, outputting the particular second text having the largest summed probability value.

16. The one or more memories according to claim 15, wherein the acts further comprise:

in response to determining that the at least one second text includes a word not corresponding to the first language, determining a target second text according to the respective first probability values corresponding to each of the at least one second text; and translating the target second text into a second language.

17. The one or more memories according to claim 15, wherein the training the machine translation model using the training samples to obtain the trained machine translation model comprises:

acquiring a speech sample containing a plurality of languages;

performing speech recognition on the speech sample to obtain a plurality of text candidates;

forming a training sample from annotated texts corresponding to the plurality of text candidates and the speech sample; and training the machine translation model using the training sample to obtain the trained machine translation model.

18. The one or more memories according to claim 17, wherein the correcting the first text comprises:

inputting the first text into the trained machine translation model; and correcting the first text using the trained machine translation model.

19. The one or more memories according to claim 17, wherein the acts further comprise:

acquiring corpus samples corresponding to each of the plurality of languages; and training the language model using the corpus samples corresponding to each of the plurality of languages.

20. The one or more memories according to claim 15, wherein:

the machine translation model is composed of an encoder and a decoder; and the encoder or the decoder includes any one of neural network models including: a recurrent neural network model, a long short-term memory network model, and a bidirectional long short-term memory network model.

21. The one or more memories according to claim 15, wherein:

the mapping relationship between words in different languages comprises a mapping relationship between words in different dialects of a same language; and the at least one second text corresponds to the same language refers to that the at least one second text corresponds to a same dialect of the same language.

* * * * *